United States Patent [19]

Gonzalez-Miller et al.

[11] Patent Number: 5,174,344
[45] Date of Patent: Dec. 29, 1992

[54] AEROSOL CAN RECYCLING APPARATUS
[75] Inventors: Walter E. Gonzalez-Miller, Campbell; Jacques M. Dulin, Cupertino, both of Calif.
[73] Assignee: Depressurized Technologies International, Inc., San Jose, Calif.
[21] Appl. No.: 715,544
[22] Filed: Jun. 14, 1991

Related U.S. Application Data
[62] Division of Ser. No. 429,852, Oct. 30, 1989.

[30] Foreign Application Priority Data
Oct. 30, 1990 [US]

[51] Int. Cl.⁵ .................................. B65B 31/00
[52] U.S. Cl. ......................... 141/65; 141/97; 141/98; 141/329; 141/89; 141/51; 100/102; 222/397; 222/83.5; 29/403.1; 81/3.009; 81/3.09; 30/448
[58] Field of Search .................. 141/65, 98, 129, 329, 141/330, 18, 20, 1, 7, 51, 97, 89-92, 165; 81/3.07, 3.2; 222/83, 80, 81, 83.5, 397, 87; 100/102; 70/448; 29/403.1, 403.7, 426.1, 426.3, 244, 801

[56] References Cited

U.S. PATENT DOCUMENTS

| | | | |
|---|---|---|---|
| 2,423,708 | 7/1947 | Keogh et al. | 113/120 |
| 2,612,065 | 9/1952 | Packer et al. | 81/3.2 |
| 2,732,741 | 1/1956 | Muller-Strobel | 81/3.41 |
| 3,000,097 | 9/1961 | Hartz | 30/272 |
| 3,333,735 | 8/1967 | Odasso | 222/82 X |
| 3,360,844 | 2/1968 | Wonneman | 29/208 |
| 3,473,499 | 10/1969 | Bishop | 113/1 |
| 3,618,429 | 11/1969 | Froeliger | 81/3.2 |
| 3,662,791 | 5/1972 | Ruscitti | 141/65 |
| 3,835,768 | 9/1974 | Kidson | 100/94 |
| 3,897,672 | 8/1975 | Scheindel | 53/37 |
| 3,993,221 | 11/1976 | Boynton et al. | 222/87 |
| 4,126,160 | 11/1978 | Gurtler | 141/91 |
| 4,133,261 | 1/1979 | Belfils | 100/280 |
| 4,166,481 | 9/1979 | Farris et al. | 141/1 |
| 4,274,453 | 6/1981 | Lee | 141/1 |
| 4,349,054 | 9/1982 | Chipman et al. | 141/1 |
| 4,407,341 | 10/1983 | Feldt et al. | 141/97 |
| 4,418,460 | 12/1983 | Ruth | 29/403.3 |
| 4,459,906 | 7/1984 | Cound et al. | 100/45 |
| 4,500,015 | 2/1985 | Penney | 222/87 X |
| 4,526,097 | 7/1985 | Cound | 100/215 |
| 4,690,180 | 9/1987 | Gold | 141/51 |
| 4,703,875 | 11/1987 | Malek | 222/386.5 |
| 4,944,333 | 7/1990 | Gold et al. | 141/51 |

FOREIGN PATENT DOCUMENTS 1607991 10/1970 Fed. Rep. of Germany ........ 141/65

OTHER PUBLICATIONS

Aerosol Lab Equipment Corp., Catalog #888, 1990, pp. 8 and 16, and associated flyer and instructional material.

Primary Examiner—Ernest G. Cusick
Attorney, Agent, or Firm—Jacques M. Dulin; Thomas C. Feix

[57] ABSTRACT

A multi-stage, batch or continuous, manual or automated process and apparatus for safely depressurizing, de-capping (decrimping plus pulling caps), and recycling aerosol cans, propellants, solvents, chemicals, dip tubes, and can tops. The apparatus includes a synchronized sorting and loading unit for guiding the cans onto an advancing line. The cans are first depressurized by a vacuum head unit comprising a vacuum seal and a reciprocable hollow needle which punctures the can recessed top cap and removes the propellants by suction for later reuse or disposal. The cans are advanced to a decapping unit where the cap member is removed by decrimping to crack the seal followed by being vertically pulled off without damage to the can's rolled lip. The reciprocating decrimper/decapper head includes a plurality of specially adapted pincers for gripping and radially inwardly deforming the cap nozzle neck (stem or insert) member thereby causing the crimped (rolled) flange of the cap to deform and unroll from the can lip at selected portions around the flange. Upon raising the decrimper head the cap member pops off the can lip. The loosened cap is released to rest atop the can. The method include unloading cans bottom side down, passing them at preselected, indexed intervals and rate along a diassembly line for depressurization, removal and recovery of propellants, and de-capping. The can top, plastic dip tube assemblies, and residual solvents and chemical contents are recovered for disposal or recycling. The cans are washed, rinsed and dried. The cans then may be de-lithoed, relabeled and refilled (repacked), or smelted for recovery of metal values. Top fill dip tube or piston type cans may be disassembled and recycled. Can process rates are high, typically in multiples of 24 cans/minute.

11 Claims, 8 Drawing Sheets

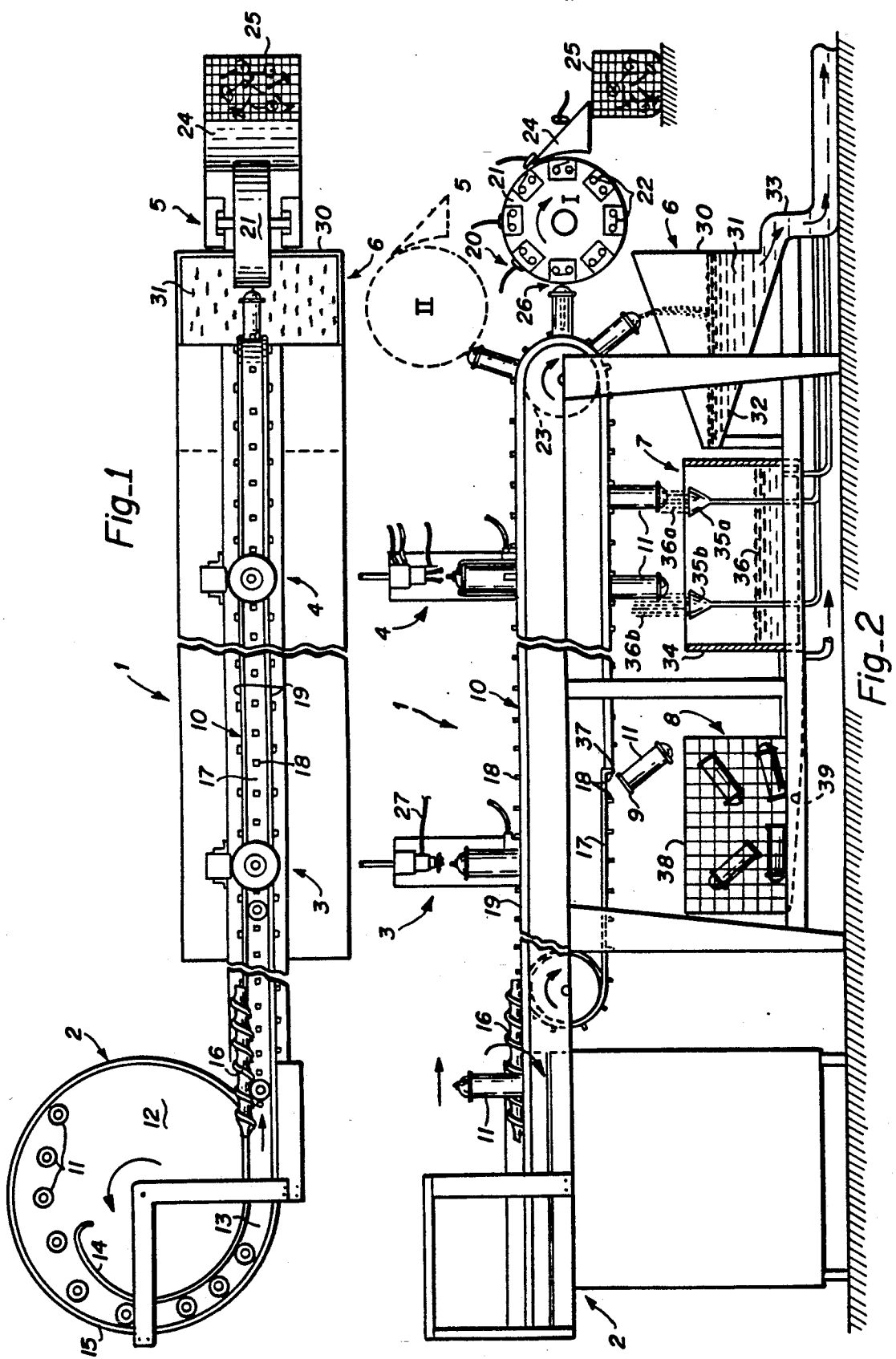

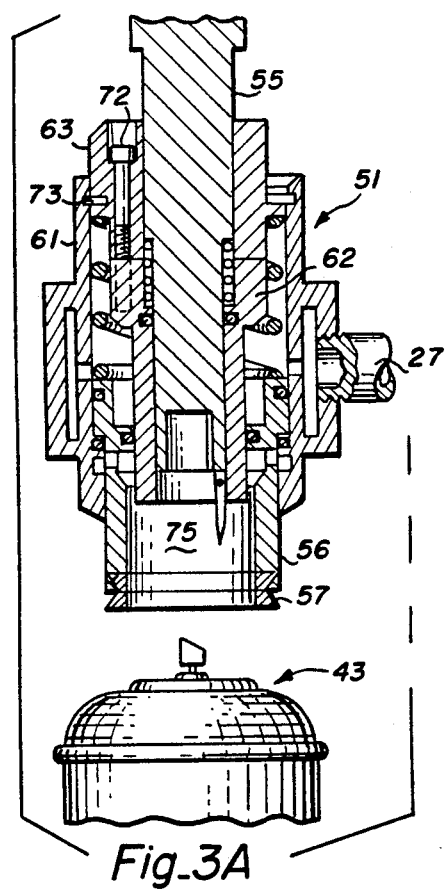
Fig_3A
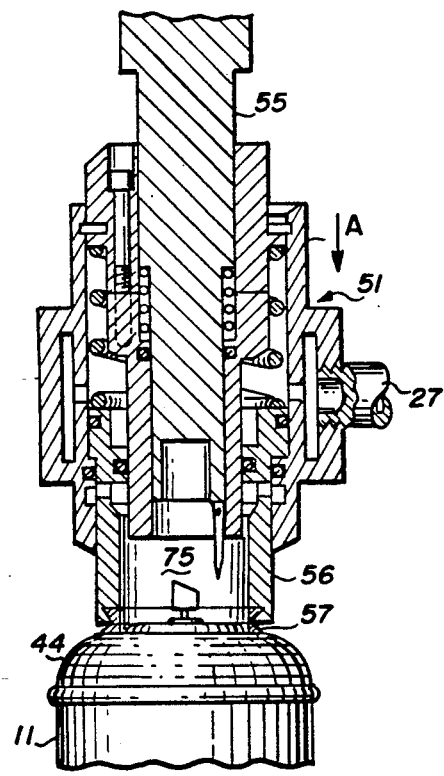
Fig_3B
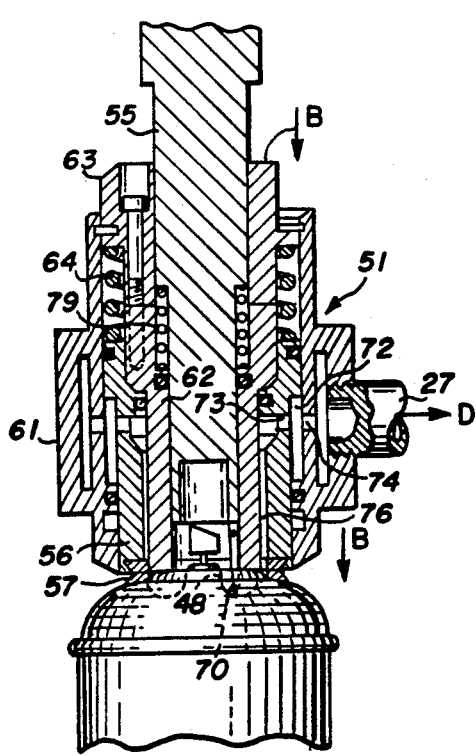
Fig_3C
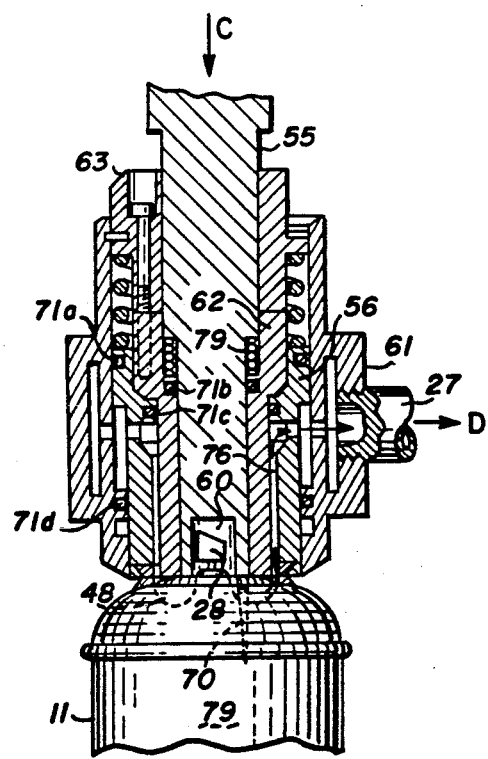
Fig_3D

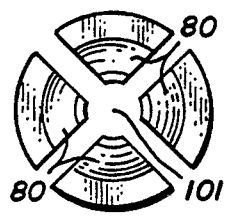
Fig_5
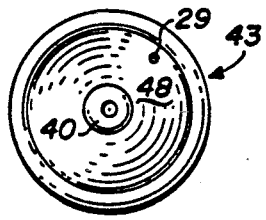
Fig_6
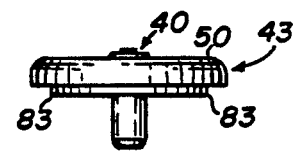
Fig_7
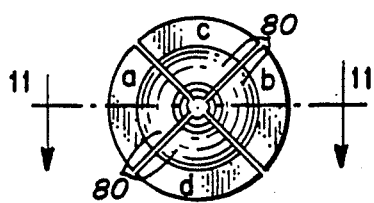
Fig_8
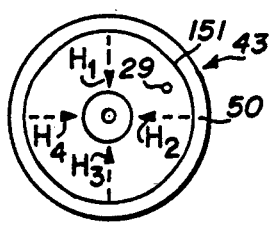
Fig_9
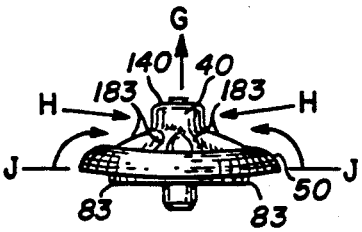
Fig_10
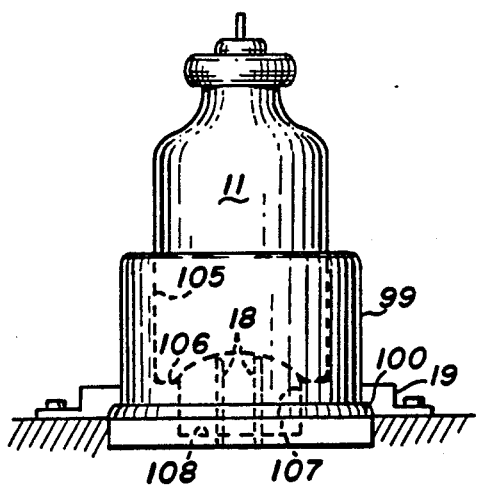
Fig_12
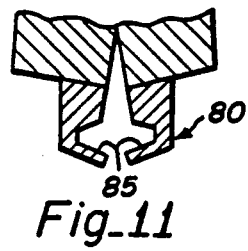
Fig_11

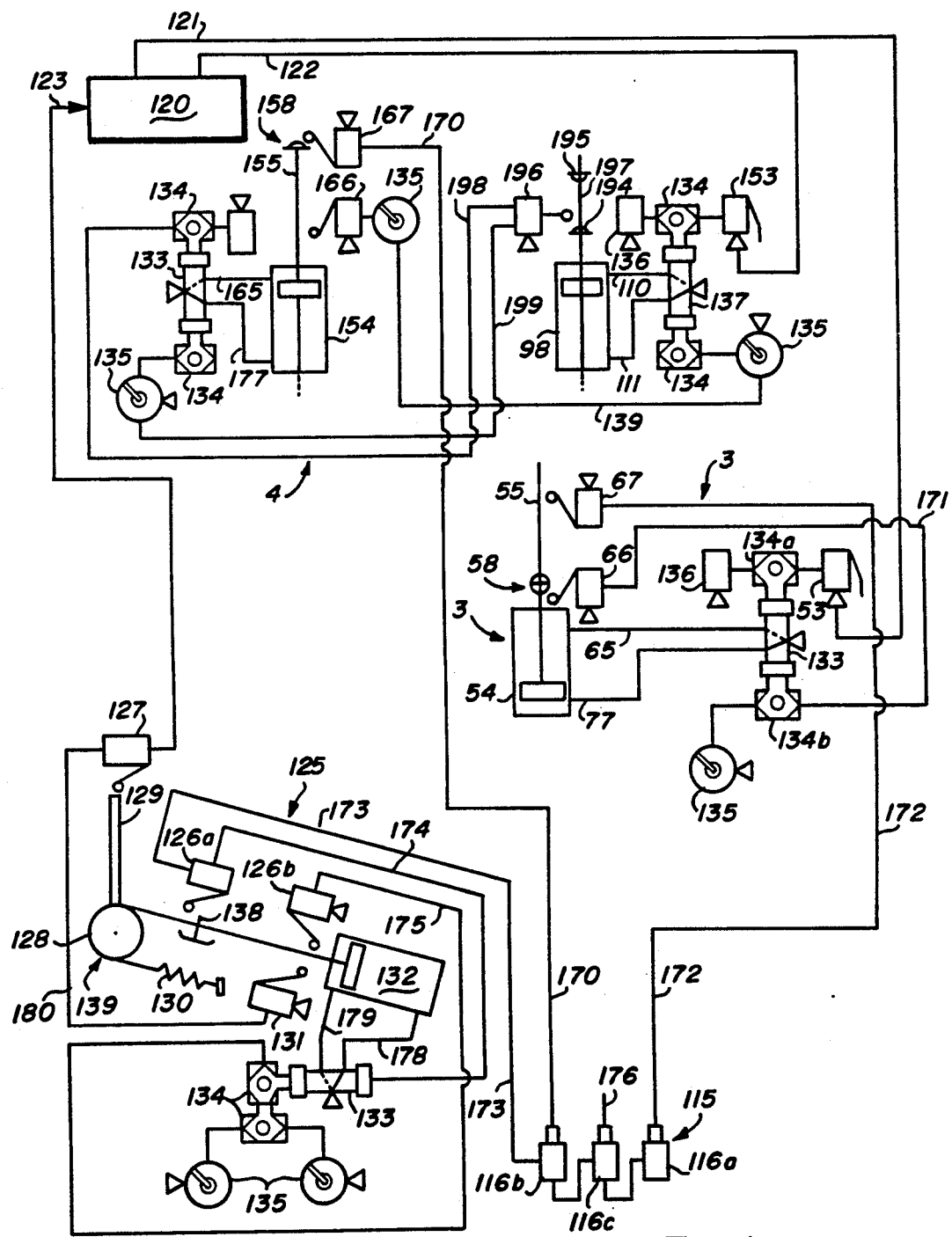
Fig_13

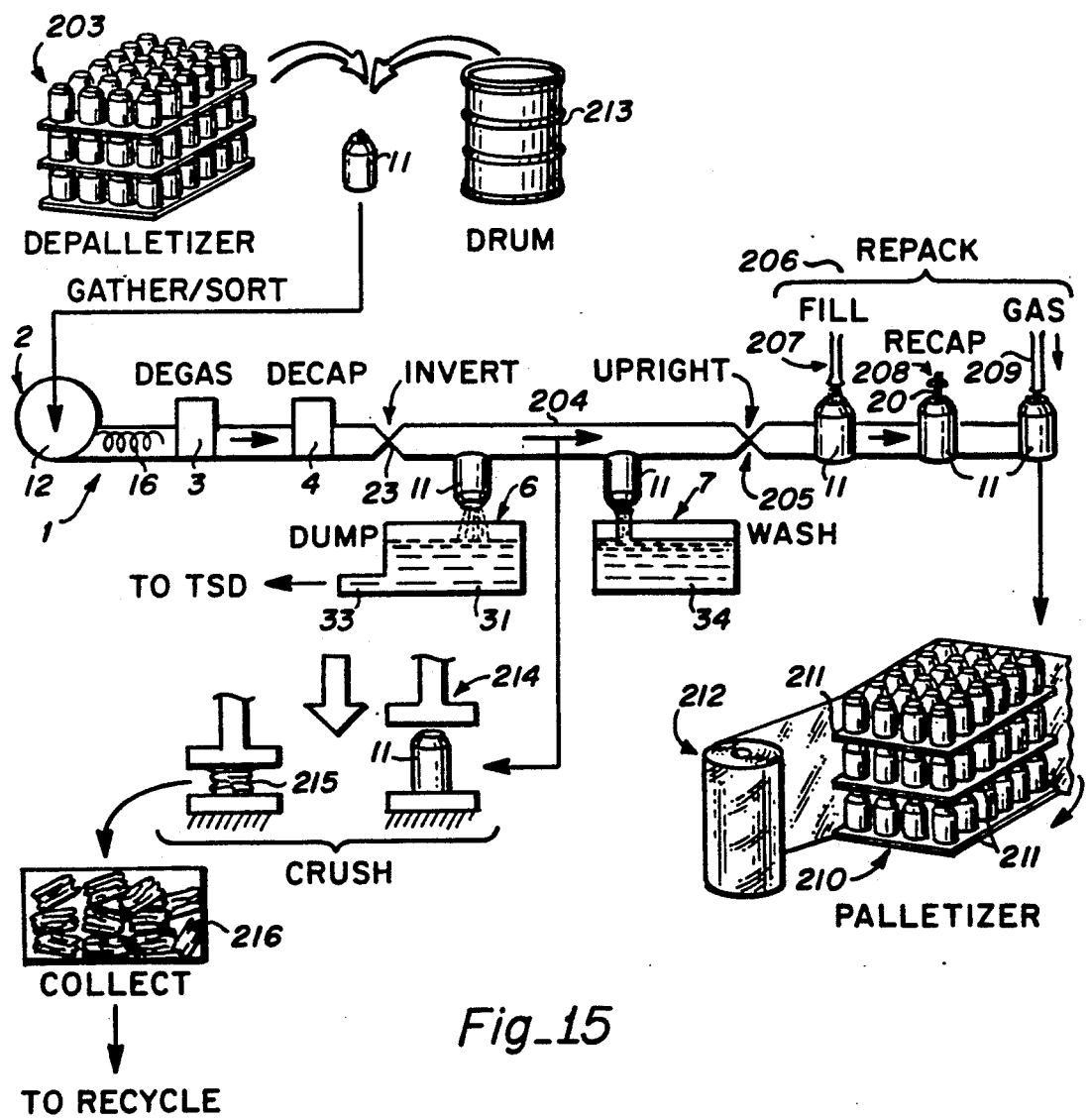
Fig_15

AEROSOL CAN RECYCLING APPARATUS

This is a divisional, pursuant to a traversed U.S. PTO election requirement, of application Ser. No. 07/429,852 filed Oct. 30, 1989 by applicants.

FIELD

This invention relates generally to methods and apparatus for recycling pressurized aerosol containers, particularly waste, overproduction or unneeded aerosol containers, or aerosol containers that have been improperly filled or rejected. More specifically, the invention relates to apparatus for safely de-pressurizing and removing the inset cap member of an aerosol can (de-crimping) in order to keep the can in re-usable condition, and to methods for the recovery of the aerosol can contents, recycling of the contents, cleaning and re-use (repacking) of the can.

BACKGROUND

Aerosol cans which are disposed in trash pose serious environmental pollution problems in that they contain propellants, solvents and residual chemicals. The current common propellants range from propane, isobutane, butane, (hydrocarbon gases) and $CO_2$ to fluorocarbons (freons). Fluorocarbons have been proven to be a major contributing factor in the deterioration of the ozone layer in the upper atmosphere allowing a greater percentage of ultraviolet rays to reach the earth's surface resulting in increased skin cancer potential. Hydrocarbon gases and $CO_2$ are contributing to a dangerous rise of global average temperatures (otherwise known as the "Greenhouse Effect"). Fluorocarbons are being banned in many countries, but are still produced in others, are still in stock, or are continuing to be disposed as consumers gradually use them or the disposed cans deteriorate.

The chemicals contained in the cans range from non-biodegradable insecticides, paints and varnishes, caustic chemicals for cleaning compositions, antiseptics, hair spray, and deodorant, to name a few. Typically, the insecticides, paints and varnishes contain petroleum-base solvents or carrier liquids.

Further, the inability to recycle the cans represents a serious waste of the various raw materials, including the hydrocarbon/$CO_2$ or fluorocarbon propellants, the solvents, the chemicals, and the can materials. These latter include aluminum or tin can materials, the balls used for mixing the contents, and various plastic parts. One of the most important plastic parts involved is high density polyethylene or polypropylene, which is currently the preferred plastic that is used for the dip tube in conjunction with the petroleum solvent carriers.

As the cans gradually corrode in landfills, they release the propellants into the atmosphere, and the solvents and waste chemicals therein into the water table. The numbers are staggering. In the U.S. alone, during only three years 1986-1988, the number of aerosol cans in all product categories produced was in excess of 8.145 billion cans, a majority of which will eventually wind up to deteriorate slowly over the years in landfills, releasing the propellant gas and seep into the atmosphere, and the waste chemicals and solvents into our water tables. Assuming all of the cans are used but understanding no can be completely emptied, and assuming therefore that only 6 grams of chemical products (chemicals plus solvents) are left in each (incompletely) "emptied" can (not including 1-3 grams of propellant necessarily left in the can), for the years 1981-1988 inclusive, this waste amounts to 259,821,000 pounds, or 129,935,000 liters, or 34,329,000 gallons of waste, the vast majority of which is believed to be improperly disposed in land fill. It is this waste (chemicals, solvents and propellants) that will be discharged over the next 5-100 years as the cans deteriorate.

The recycle value of the cans is significant. For the 3 years 1986-1988 in the U.S., some 2,854,000,000 cans fall in the personal use category of which almost all are aluminum. If only 10% of all 8.145 billion cans are aluminum and they are on the average a small 9 ounce can (a conservative figure), then on the average there are 13 cans/per pound. The aluminum content amounts to 62,660,000 pounds with a recycle value of $56,400,000 in today's market. For every can recycled, there is also energy of production saved, and a reduction in pollution (e.g. reduction in coal, oil or gas burned to produce electricity to electrolytically refine bauxite to aluminum, and then to roll sheet and form cans).

Empty containers, including spent aerosol cans, which typically contain 3% or more of the original liquid (chemical), are considered "hazardous wastes" and may be disposed only in accord with federal, state, or local codes and/or regulations. For example, in California, under the Tanner bill, disposal of household hazardous wastes (in which spent aerosol cans are included) will be closely regulated by counties and cities as part of the California State Hazardous Management Plan. By Nov. 1, 1989, counties and cities must submit a plan for safe disposal of hazardous wastes to the state. States have in place or are looking to mandate segregation and curbside collection of such hazardous wastes. Curently, spent aerosol cans are being landfilled, but the Federal Hazardous Substances Waste Act calls for phase-out of disposal of all untreated hazardous wasted in landfills by 1992. If that deadline to ban landfill disposal of cans is met, then because of their "time bomb" nature (delayed release of propellants to the atmosphere and leakage of chemicals of solvents into the soil and/or water table), aerosol can production would drop drastically or require expensive treatment or incineration. Incineration poses other problems, not the least of which are increased $CO_2$ emissions, and the requirement to scrub the incinerator off-gases.

Additionally, there are problems associated with filling the aerosol cans. The solvents used in combination with some chemicals under pressure may cause differential swelling between the plastic dip tubes and the collar in the cap member of the aerosol can that receives and holds the dip tube. This results in the all too common occurrence of a disconnected dip tube, which can sometimes be remedied by operating the aerosol can in the upside down position. But usually the aerosol can is rendered useless by a disconnected dip tube as consumers will not buy such cans.

Various U.S. Patents, such as: U.S. Pat. Nos. 3,835,768 (Kidson, 1974); 4,133,261 (Belfils, 1979); and 4,418,460 (Ruth, 1983), teach recycling non-aerosol cans by total destruction of the can by a process involving puncturing the side wall of one can at a time. This process wastes energy in crushing the cans and then reforming them by smelting, sheet metal rolling and forming the sheet into new usable cans.

Many of the propellants used in aerosol cans are explosive or flammable, and therefore the process of disposal, emptying and recovery of the contents of rejected or partially used aerosol cans involve many safety considerations. U.S. Pat. Nos. 4,349,054 (Chipman et al., 1982); 4,407,341 (Feldt et al., 1983); 4,459,906 (Cound I, 1984); and 4,526,097 (Cound II, 1985) teach various multi-stage processes for the safe transfer of contents, disposal or recycling of aerosol cans. These patents employ an apparatus having an enclosed chamber wherein the aerosol container is fixedly retained and the side wall punctured. Next, the contents are discharged into a receiving area to be recycled, and the ruined can is then cleaned and compacted (crushed). Again, these patents do not permit reuse of the original aerosol containers, as the methods and apparatus used for reclaiming the contents effectively destroy the mechanical integrity of the can.

Most cans today fall generally into one of three classes:

A) a two-part construction, such as a spun aluminum soft drink can having a body (base and side walls) with a lid attached by a rolled flange;

B) a three-part construction, where both top and bottom portions are attached to a drawn or sheet metal body by rolled flanges; or, C) a four-part construction, e.g. a typical aerosol can having a drawn or seamed sheet metal body (tubular side wall) attached to a top and bottom portion by a rolled flange, wherein the top is apertured to receive a central cap containing the valve and dip tube assembly.

U.S. Pat. No. 2,423,708 (Keogh et al., 1947) teaches salvaging metal cans by cutting off the top end closure of a single-closure type can. After the can is cleaned, it is subjected to further drawing action, which thins the walls and bottom portion while restoring the length of the can body to its original height. A new closure is then installed on the thinner-walled can. This process requires a two-part can, that is, a can having a body (base and side walls) drawn from a metal blank, and the lid is secured at the open end. This method is not efficient since the recycling process involves the added cost of a secondary drawing, and is limited to one or two applications at most before the walls of the can are too thin for reuse.

U.S. Pat. Nos. 3,473,499 (Bishop, 1967) and 3,618,429 (Froeliger, 1969) disclose methods to remove a flanged metal container top by applying a downward axial force to the top to bow it sufficient to deformingly unseal the rolled flanges.

Bishop U.S. Pat. No. 3,473,499 teaches a method to open a can top wherein two half-cylindrical body parts are brought together around a can so that the outwardly directed flange or seam of the can overlaps the end faces of the body parts, the end faces being frusto-conical. There is also provided a plunger that is downwardly and axially engaged to the top of the can, thereby causing the flange or seam to be forced against the frusto-conical end faces causing the flange or seam to be unrolled or stretched outwardly releasing itself from the side wall of the can. This method tends to destroy the can body lip so that reuse of the can is not feasible.

Froeliger U.S. Pat. No. 3,618,429 teaches a similar method to remove the lid of a drum wherein a plunger having a blunt surface is engaged with the lid of a drum causing deformation to the lid as the plunger moves axially downward. The plunge end also includes radially outward extending jaws that are for grasping the bead of the lid while the plunger deforms the lid material causing the bead of the lid to unroll off the can body lip. The drum is usually reusable in this method.

However the methods taught in both Bishop and Froeliger are designed to apply only to drum-type containers (a container wherein a flat lid extends to the outer diameter of the container) and will not work on aerosol cans due to the fact that the cap containing the aerosol valve and center riser portion is inset and smaller than the can diameter, and the can top is usually a raised dome. In addition, these methods are intended for non-pressurized containers and are extremely unsafe for aerosol cans which are typically under high pressures (100-150 psi). More over, aerosol cans, by the nature of their contents (solvents, chemicals, propellants, etc.), are dangerously flammable and explosive if punctured or opened improperly.

It is also known to use pincer-like tools in combination with a plunger device to remove closures of containers. U.S. Pat. No. 2,612,065 (Packer et al., 1952) and 2,732,741 (Muller-Strobel, 1956) teach the use of side grippers or pincers that engage the perimeter of either a crown cap or insertable plug-type metal covered rubber container plug after which a plunger is actuated downward, whereby the cap or plug is released from the container. One of the two side grippers disclosed in Packer has an added cam disposed to force the side gripper up and outward upon actuation of the plunger thereby deforming the affected part of the crown cap. This is simply a mechanical crown-type bottle cap opener. In Muller-Strobel side pincers apply a radially inward force to the sides of the metal-foil covered rubber plug above the bottle opening. A downward plunger movement prevents the rubber from buldging upwardly. The plug can them be pulled out of the bottle. These methods work well for the bottle-type of enclosures for which they were designed, but they are not suited to remove the top cap from an inset cap type metal aerosol container without damaging the container.

Accordingly, there is a need in the art for an apparatus and method to safely remove the inset center cap member of mis-filled, partially empty and spent aerosol cans without damaging the can or dome top itself so the can may be reused while reclaiming the residual contents, and separating the different materials in order to be recycled and prevent pollution of the environment. There is a need for a cost-effective method and apparatus for reclamation, cleaning and re-labeling of the containers, and recycling of the expensive plastic dip tube and other can parts, including the can body.

THE INVENTION

Objects

It is a principal object of the present invention to provide an apparatus which mechanically performs the operation of removing a rolled flange-type inset cap member from a depressurized aerosol can without deformation to the can or the dome top so that the can may be reused or recycled.

It is another object of the invention to provide an apparatus and method for rapidly and safely depressurizing an aerosol can and removing its contents without damaging the can, and which prevents polluting the environment with can gas (propellant) and chemicals.

It is another object of the invention to provide methods for recycling excess, mis-filled or spent aerosol cans in which methods the aerosol cans are depressurized, the caps removed, and the propellants, contents (chemicals and solvents), and the plastic dip tubes are recovered to be recycled or otherwise properly disposed.

It is another object of the invention to automate a method for recycling aerosol cans in a high speed assembly line-type arrangement.

It is another object of the apparatus which removes the loosened cap and dip tube assembly from aerosol cans moving along a conveyor and collects them for convenient storage and retrieval.

It is another object to provide a fully automated process which prepares a full, spent, defective or mis-filled aerosol can for reuse whereby the cans are sorted and loaded onto an assembly line in a synchronized fashion, safely depressurized, de-capped, washed, dried, and collected for reuse or recycling, with provision for recovery of the aerosol propellants for reuse or proper disposal, recovery and reclamation of the can's residual contents (chemicals and/or solvents), and for recovery of the can's metal cap and plastic dip tube assembly for recycling (repacking).

It is another object of the invention to provide a method for depressurizing and recycling button-plugged aerosol cans without destruction of the can.

It is another object of the invention to provide an apparatus and a method for recycling aerosol cans, including depressurizing mis-filled or spent cans, removing the caps, cleaning the cans, and refilling (repacking) them with new or different contents including steps of delithoing and relabeling recovered cans.

Still other objects of the invention will be evident from the Specification, Drawings and Claims of this case.

SUMMARY

The present invention comprises apparatus and processes for safely depressurizing, de-capping (decrimping) and recycling aerosol cans by means of a pneumatically or electro-pneumatically driven assembly line at high speed comprising the following means (assemblies) and steps:

1. Unloading a batch of cans, bottom side down, onto a rotary disc or vibrating screen-type can feeder unit, optionally employing a depalletizer;

2. Selectively advancing the cans in sequence from the can feeding machine onto a moving conveyor of the assembly line by means of a timed feeder means, such as a timing screw;

3. Safely depressurizing the aerosol can by lowering a vacuum head onto the can top, puncturing the can cap member by a hollow needle, rapidly removing the propellants and other gaseous contents (product and/or solvent vapors) by means of a vacuum drawn through said hollow needle, and storing the propellants and other gases, preferably off-site for later reuse, use or proper disposal;

4. Removing the cap member from the can body without damaging or altering the can body or dome top by use of a special decrimper assembly comprising a decrimper head lowered onto the can top. The decrimper head includes a plurality of specially adapted pincers (preferably four pincers), which are sufficiently opened in a neutral position, to be directable over and around the can cap crown (stem) member. The pincers are then closed, thereby applying a uniform inwardly directed radial force to the cap crown (stem) at a plurality of equally spaced points about the crown stem. This causes the annular horizontal areas surrounding the cap crown stem medial of the pincer contact point to be drawn radially inwardly toward the crown (stem), thereby causing the cap flange to deform and unroll from the lip of the can without damage to the lip. The pincers and decrimper head are then raised vertically upward as a unit causing a further bowed-upward deformation to the cap member until any remaining bond between the cap and the can lip is broken. This complex process is termed "decapping" herein. The pincers are then opened, thereby releasing the cap member to rest loosely on top the can lip;

5. Removal and collection of the loosened cap and dip tube assemblies, for example by passing the cans adjacent a magnetized rotating disc which plucks the cap and connected plastic dip tube assemblies from the cans. The metal cap member and plastic dip tube assemblies are collected for later sorting and reclamation of the separate metal and plastic components;

6. Removal of any residual solid or liquid contents (chemicals and solvents) for later recycling for reuse, or proper disposal;

7. Washing and drying of the empty cans, and optionally de-lithoing (removal of painted-on text and logos) the cans;

8. Collection, storage and shipping of the undamaged de-pressurized, de-crimped, de-capped and cleaned aerosol cans (herein "reclaimed can bodies") for later reuse (repacking), reclamation or recycling; and 9. Optionally refilling (repacking) the reclaimed can bodies in an aerosol can filling line (including relabeling the refilled cans).

The entire line may be shrouded or surrounded by a hood to capture can content vapors. Alternately, a negative pressure travelling boot may be placed around the advancing cans in the process, preferably steps 2 through steps 5 or 6.

The process for bottom-plugged cans involves similar steps, except that the depressurizing needle may be directed upwardly through the rubber or plastic grommet plug in the bottom of the can, while simultaneously or sequentially thereafter the cap is decrimped as described. Alternately, the bottom-plugged can may be inverted in the depressurizing step (bottom up), and righted for the decrimping step.

The specific embodiments described below are with reference to a linear recycling line, but it should be understood that the line may be laid-out in a rotary configuration, and/or may involve multiple depressurizing and/or decrimping heads per line. In contrast to cycle times of 6 per hour in prior can-destructive machines, the rate of this apparatus and method is on the order of multiples of 24 cans/minute.

DRAWINGS

The invention is illustrated in more detail in the drawings in which:

FIG. 1 is a top plan view of an apparatus for recycling aerosol cans in accord with this invention showing a single index assembly line moving the cans at regular intervals along the line to a plurality of stations where the cans are individually de-pressurized, de-capped, emptied of residual product, washed, dried and the can contents (both propellants and chemicals) and the plastic dip tube and crown (cap) assembly are recovered and collected for later reuse or proper disposal;

FIG. 2 is a side elevation view of FIG. 1 showing in greater detail the recovery and collection of the plastic dip tube and crown (cap) assembly, the recovery of the can product (chemical or solvent), the can washing station, can drying station and the can recovery station spaced along the assembly line;

FIGS. 3A-3D are a sequence of four side elevation views, partially in section, of the depressurizing vacuum head of FIG. 3, showing the stepwise functioning of the hollow needle in puncturing the capped top of the aerosol can and providing a vacuum pathway for exit of the gaseous contents from the pressurized can;

FIG. 5 is a face view of the decapper (decrimper) head in the open position taken along line 5—5 of FIG. 4A;

FIG. 6 is a top view of the can cap taken along the line 6—6 in FIG. 4A showing a puncture hole to indicate that depressurization of the can has taken place but before the decapping step;

FIG. 7 is a side elevation view of FIG. 6;

FIG. 8 is a face view of the decapper head in the closed position taken along line 8—8 of FIG. 4D (the cap crown is omitted for clarity);

FIG. 9 is a top view of a decrimped cap taken along line 9—9 of FIG. 4D (the decrimper head is omitted for clarity) showing the direction of forces applied to the cap crown and the resulting arcuate deformations of the cap perimeter;

FIG. 10 is a side elevation view of the decrimped cap of FIG. 9 showing the unrolling of the cap flanges due to the inwardly directed radial forces applied to the cap crown;

FIG. 11 is a partial cross section view of the pincers of the decapper head taken along line 11—11 of FIG. 8 (pincers c and d are omitted for clarity);

FIG. 12 is a side elevation view of universal a can "carrier puck" and a two or three part can (i.e. a can without a lipped bottom) retained therein;

Figure 14:
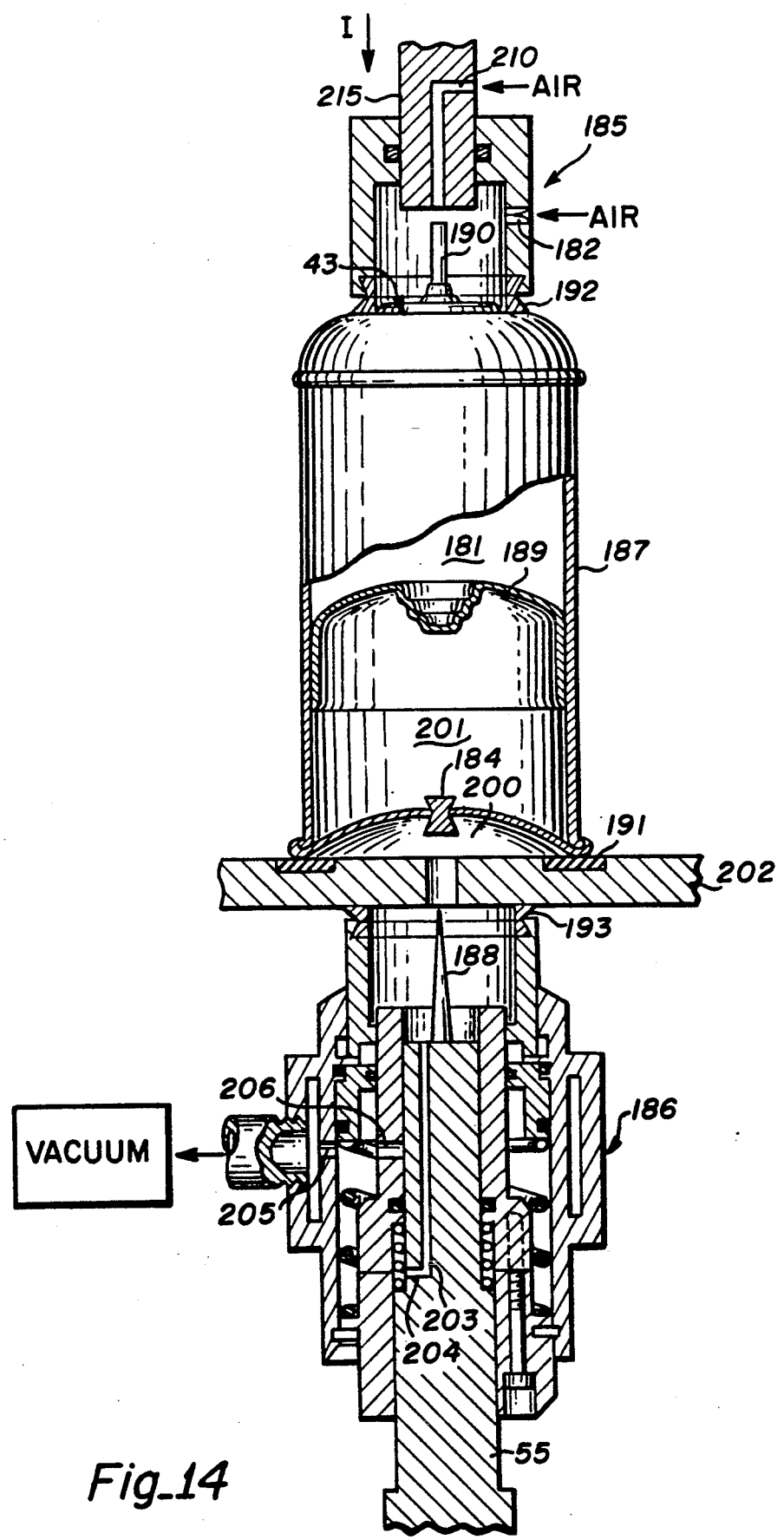

FIG. 13 is a schematic of the logic for the operation of the assembly line of this invention; and FIG. 14 is a side elevation view, partially in section, showing an alternate embodiment of the vacuum head assembly adapted for bottom pressurized (plugged) aerosol cans; and FIG. 15 is a schematic design of the system apparatus of FIG. 1 showing the additional system components of depalletizing and placing pressurized cans onto the rotary disk, the can crusher, the can repacking, and palletizing of repacked (refilled) cans.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

OVERVIEW OF THE ASSEMBLY LINE

The general layout of the invention is best illustrated in FIGS. 1 and 2, which are top plan and side elevation views, respectively, of the aerosol can recycling machine 1 (hereafter "recycling machine 1"). The recycling machine 1 of this invention recycles aerosol cans 11 by employing, in a continuous process, several timingly linked sub-assemblies (herein "stations") spaced along conveyor belt 10, including a can feeder 2, a vacuum head assembly 3 (the depressurizing station), a decrimper/decapper head assembly 4 (the de-capping station), a dip tube and cap collection assembly 5, a product dump station 6, a can washing/drying station 7, and a can recovery station 8. Alternately, a separate can drying station (not shown) may be used between the can washing station 7 and the can recovery station 8, if desired.

A hood (not shown) may be placed over the entire recycling machine 1 for the collection of excess chemical vapors and propellants that may escape from the cans during the depressurizing and de-capping stages, or until the cans are completely emptied of their contents and washed and rinsed. The hood is provided with appropriately dimensioned exhaust stack(s) in order to create enough draft to draw the contaminated air through the stacks to a scrubbing system prior to discharge to the ambient atmosphere. Suitable hood(s) and scrubber system(s) able to meet local, state and federal air quality regulations are currently commercially available.

While the recycling machine 1 is illustrated in the drawings as having some of the stations disposed along the underside of the conveyor belt 10, it should be understood that more or fewer of the stations 2-7 could be positioned in either orientation, that is, along the topside or underside of the conveyor belt 10. In addition, if it is desired to separate the primary can processing steps, from the secondary process steps, a second assembly line may be added to handle the secondary process steps.

For example, the vacuum head assembly 3, the decrimper/decapper head assembly 4, and the dip tube removal and recovery assembly 5, being primary can operating process stations (i.e. being dependent upon a power supply for continuous line operation), may be arranged in one line or even in a rotary fashion, where all stations are interlocked (synchronized) and are driven by pneumatic or electro-pneumatic operation. The product dump station 6, can washing station 7, and can recovery station 8 can be strung together on an independent secondary process step assembly line that is interfaced with or separate from the primary process step assembly line in the appropriate place. The secondary line can be placed immediately after the dip tube removal and recovery assembly 5 where the conveyor belt would normally reverse its direction as in FIG. 2.

It is also understood that while the recycling machine 1 shown is a single index, single lane, in-line machine having a capacity of 24 cans per minute, a greater can processing capacity can be achieved by using a double, triple, or even quadruple index arrangement (i.e. multiple heads 3 and 4), and/or by using one or more lanes (parallel line operation). A double index arrangement (48 cans/minute) requires each primary can operating process station (e.g. the vacuum head assembly 3, decrimper head assembly 4 to be doubled in series, whereby two sequentially tandem cans are positioned one directly in front of the other, and are acted-on simultaneously at each of the primary can operating stations and the paired cans are indexed (advanced) in tandem, 2 at a time. The dip tube removal wheel 21 is simply rotated faster to keep up.

In the preferred best mode of the invention, the operation of the recycling machine 1 begins with the loading of pressurized aerosol cans 11, bottom side down, onto a rotary disk 12 of the can feeder 2. The pressurized cans 11 may be unloaded onto the rotary disk by hand or by use of a commercially available depalletizer, which unloads entire layers of pallets of cans at a time. The pressurized cans 11 are then guided into the lane 13 by the feeder guide 14 and prevented from falling off the rotary disk by the guard rail 15. In an alternate embodiment, a conveyor belt or a vibrating screen may be substituted for the rotary disk 12.

Once the pressurized cans 11 are guided into the lane 13, they are selectively positioned onto the conveyor belt 10 by advancing along threads of the rotating timing screw 16. The conveyor belt 10 preferably comprises a slotted stationary track 17 along which a chain, having uniformly spaced upstanding pusher links 18, is driven. The upstanding pusher links 18 serve to move the cans down the lane 13 from one station to the next by pushing on the backs of the cans. Spaced-apart guide rails 19, having a gap dimension (distance between opposite rails) and rail height sufficient to permit moving cans therebetween, are positioned along opposed sides of the track 17 and are adapted to restrain tipping, sideways, or vertical movement of the travelling cans 11. The guide rails 19 typically may restrain vertical movement of the can 11 by means of a lip 19a (FIG. 3) that engages the lateral protrusion of the can bottom flange 9. This also permits retaining the cans 11 so they can travel upside down in the vicinity of the product dump station 6 and can washing/drying station 7 (see FIG. 2).

At the first, depressurizing station, (vacuum head assembly 3), the cans 11 are depressurized and the propellant is removed by a vacuum line 27. The cans 11 then proceed to the second, de-capping station 4 including the decrimper head assembly. The decrimper head assembly 4 serves to disengage or separate the dip tube and inset cap assembly 20 from the individual cans 11. The cans 11 then proceed to the third station, cap/dip tube removal and recovery assembly 5. It is at this point where the assembly line drive chain rotates about drive wheel 23 (clockwise in FIG. 2) thereby reversing the direction of can travel 180°. Wheel 23 may be an undriven idle wheel.

The cap/dip tube removal and recovery assembly 5 comprises a rotatable disk 21 having solenoid switches 22 selectively spaced along its perimeter, a scraper ramp 24, and a basket 25. The disk 21 rotates in a clockwise direction as shown by arrow I in FIG. 2, and its period of rotation is coordinated with that of the chain advance so that the individual solenoid switches 22 coincide with the oncoming cans 11 along the assembly line drive chain 10 at a suitable point of intersection 26. Just prior to reaching the point of intersection 26, the individual solenoid switch 22 is activated, thereby magnetically attracting the dip tube and cap assembly 20 of the on-coming aerosol can 11 on to the magnetic wheel 21 by virtue of its ferrous elements, usually an internal spring and/or valve assembly (ball). After the activated solenoid switch 22 has rotated past top dead center, the solenoid switch 22 is deactivated, whereby further rotation results in the dip tube and cap assembly 20 tumbling off or being peeled off the rotating disk 21 by the scraper ramp 24. The extracted dip tube and cap assemblies 20 are then deposited in basket 25 for parts recovery processing or disposal. If the cap is non-magnetic, wheel 21 may employ spaced fingers to grasp the stem 40 or exterior lip 50 (see FIG. 10). Alternately, an inclined screen above liquid level 31 in reservoir 30 can collect the cap/dip tube assembly.

After removal of the dip tube and cap assembly 20, the cans 11 continue along the assembly line drive chain 10 to the product dump station 6. Upon reaching the product dump station 6, the cans 11 become inverted causing any residual liquid and/or chemical product 31 (e.g. solvent and product) to empty into the product dump reservoir 30. The bottom wall 32 of the product dump reservoir 30 is preferably elevated at one end to aid in the removal of product 31 to the recovery pipeline 33. The recovered product 31 may then be recycled or otherwise properly disposed.

The empty cans 11 then proceed to the can washing station 7 where they are subjected to one or more jets of bath solution 36a emanating from one or more spray heads 35a. The bath solution 36 may be a common soap and water combination or any other solvent required to thoroughly clean the inside of a particular run of misfilled or spent aerosol cans. The bathtub 34, having the spray heads 35 disposed centrally therein, is sufficiently dimensioned to collect the resulting overspray of bath solution 36. The bath solution 36 may be recirculated from bathtub 34 to spray heads 35a and for 35b by suitable plumbing (not shown). The wash water/cleaning solution may be treated to recover additional solvent and/or product, or disposed by conventional methods. Optionally, forced air 36b from head 35b may be used to dry the can interior. Microswitching (not shown) may be mounted along the track 17 just before and after each of the spray heads 35a and 35b, which upon engagement with an approaching can sends a signal to activate or deactivate the spraying activity. Thus energy is conserved in the operation of can washing (and drying) station 7 as it is used to operate the spray heads 35a and 35b only when the cans are passing over the bathtub 34. Note that since the cans pause at the depressurizing-/degassing and decapping stations 3 and 4, due to the intermittent indexed motion of belt 10, they also pause at the washing/drying station 7 for a time sufficient to effectively scrub the cans.

The washed or/and dried cans 11 then proceed to the can recovery station 8. The bottom flange 9 of each can 11 is no longer restrained by the guide rails 19 once the individual cans 11 are pushed by its corresponding upstanding chain link 18 beyond the terminal end 37 of the guide rails 19. Gravity causes the cans 11 to fall from the track 17 and into the storage receptacle 38. A drip tray 39 is positioned beneath the storage receptacle 38 and the resultant space between the storage receptacle 38 and the bath tub 34 in order to recover any dripping bath solution 36 from the previously washed cans 11. Alternatively, a can drying station may be inserted immediately after the can washing station 7 to avoid the problems of wet or dripping cans during the can recovery stage.

A suitable hood (not shown) may be fitted over the entire aerosol can recycling machine 1 of this invention to collect and vent any vapors or gases that may escape from the pressurized aerosol cans. Alternatively, one or more smaller hood(s) may be positioned over the appropriate stations, e.g. vacuum head assembly 3 and/or decrimper 4, and/or washing/drying station(s) 7 to vent any gases that may escape during various processing step(s).

Figure 3:
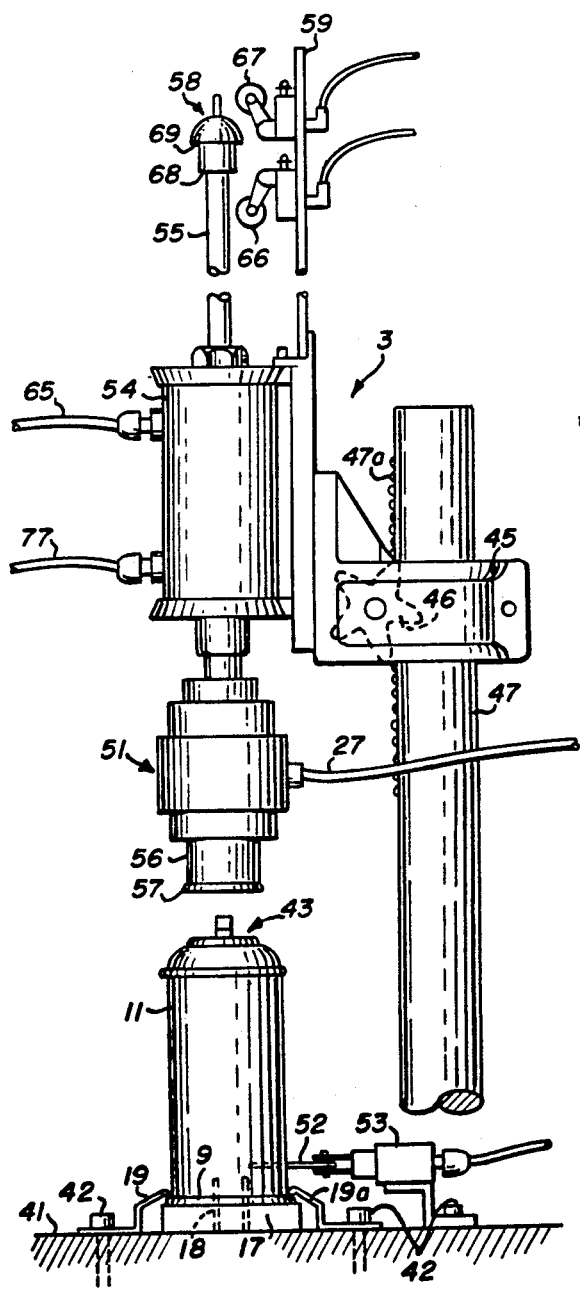
FIG. 3 is a side elevation view of the first, can depressurizing head station of the assembly line apparatus of FIGS. 1 and 2, showing a vacuum head and a pressurized aerosol can positioned thereunder.

As is best seen in FIGS. 3 and 12, the aerosol cans 11 are pushed along the track 17 by individual upstanding chain pusher links 18 (shown in phantom). The distance between the opposing guide rails 19 is sufficient, both vertically and horizontally, to permit the diameter defined by the side walls of the cans 11 to pass, and at the same time, to hold down the slightly greater diameter bottom of the flange 9 of each can 11 by lip 19a. The guide rails 19 are adjustably fastened to and positionable on the table plate 41 by fastening screws 42.

DEPRESSURIZING HEAD ASSEMBLY

The operation of the depressurizing (vacuum head degassing) assembly 3 will now be described by reference to FIG. 3 and the four sequential operational cross-section views FIGS. 3A-3D. As the cans 11 move into position under vacuum head 51, arm microswitch 52 of table-mounted pneumatic sensor 53 is activated by the can, thereby sending a signal to vacuum head assembly 3 to stop the conveyor belt travel and begin operation. Air is injected into cylinder 54 via injection line 65 filling cylinder 54 and causing shaft 55 and vacuum head 51 to be lowered as an entire unit onto the can 11 (as indicated by downward direction arrow A in FIG. 3B). The isolation bell 56 is positioned to cover cap 43, and an air tight seal is created by the engagement of pliable rubber ring-like vacuum seal member 57 onto raised dome 44 of can 11 around cap 43 (see FIG. 3B).

The functioning of vacuum head 51 involves two distinct reciprocating motions that are controlled by feedback signals generated by pneumatic sensors 66 and 67 positioned along post 59, and by vacuum shut-off valves in vacuum line 27, for a completion of one operating cycle. The first reciprocation is triggered by the activation of pneumatic sensor 66 by lower contact 68 of the mushroom contactor head 58 disposed on top of shaft 55 (see FIG. 3).

Referring now to FIG. 3C, a first unit assembly comprising: (a) the vacuum sleeve and casing 61; (b) collet 62; (c) vacuum top housing 63; and (d) shaft 55, reciprocates vertically downward with respect to the isolation bell 56 (as indicated by downward direction arrow B). This first reciprocation is biased against spring 64, and is completed when the bottom end of vacuum sleeve and casing 61 is positioned substantially horizontally even with the midsection end of vacuum seal 57 and hollow needle 70 has come to rest just above the top outer surface 48 of can cap assembly 43. This position is intermediate FIGS. 3B and 3C. In the first reciprocation, an airway is created whereby port 73 of isolation bell 56 is in communication with port 74 of vacuum sleeve and casing 61 via annular space 72. Annular space 72 becomes fully developed upon the first downward reciprocation. Thus an exit route for pressurized propellants from isolation bell chamber 75 to vacuum line 27 is created.

FIG. 3D shows the second reciprocating movement where shaft 55, having a hollow or grooved needle 70 disposed at its lower end and attached integral therewith, is plunged downwardly (as indicated by Arrow C) relative to the rigidly held four-piece assembly comprising: (a) the vacuum sleeve and casing 61; (b) collet 62; (c) vacuum top housing 63; and (d) isolation bell 56. This second reciprocation causes the hollow needle 70 to pierce the top surface 48 of cap 43 and de-pressurize (degas) the can 11 by draw-off of the propellant by a vacuum pump connected to line 27. The downward plunging shaft 55 is biased against spring 79 and has a hollow relieved area 60 adjacent its bottom end with sufficient annular depth and lateral clearance to permit full downward reciprocal movement of shaft 55 without damaging the spray nozzle unit 28 or stem 40 of the aerosol can 11.

Once the shaft is fully extended downward, the pneumatic sensor 66 is engaged by upper contact 69 of mushroom head 58 (see FIG. 3) thereby activating vacuum line 27. The propellants are removed by suction from the can 11 through the exit route created by the first reciprocation as seen by direction arrow D. That is, the residual propellants and other gases exit the can via the airway through isolation chamber 75, to port 73, to annular space 72, to port 74, to a second annular passageway 76 to the vacuum line 27, as is generally indicated by the path of small arrows in those spaces. Four O-rings, 71a-71d, are included in the assembly of the vacuum head 51 to prevent "blow by" of gases, and/or loss of vacuum pressure between the vacuum sleeve and casing 61, and isolation bell 56 (O-rings 71a and 71d); collet 62 and shaft 55 (O-ring 71b); and isolation bell 56 and collet 62 (O-ring 71c).

Once depressurizing (degassing) is complete, a shut-off valve (not shown) in the vacuum line 27 is triggered (e g. by can pressure drop) sending a signal to exit line 77 (see FIG. 3) causing the pressure in cylinder 54 to be bled off. The compressed springs 64 and 79 thereupon reverse the two reciprocating processes, ultimately raising the vacuum head 51 back up to the original position. A full upward extension of the shaft 55 causes the mushroom head contactor 58 to trigger the pneumatic sensor 67, which restarts the chain 18, releasing the now de-pressurized can 11 to be sent on down the assembly line to the decrimper/decapper head station assembly 4.

Referring back to FIG. 3, while the optimum clearance between the bottom of isolation bell 56 and cap 43 in the neutral mode ranges from 15/16 in. to 1 15/16 in., the depressurizing vacuum head assembly 3 may be manually adjusted vertically by operating a hand wheel 46 and pinion gear (not shown) to raise or lower the head mounting casting 45 along the track 47a of the adjustment post 47 in order to compensate for a run of cans of a different height.

It should be understood that mechanical or photo-optical can height sensors may be positioned in association with the vacuum head assembly, e.g. just before it, to activate the casing 45 or shaft 47 to raise or lower the assembly 3 (preferably hydraulically or pneumatically) to compensate for different can heights. Thus, cans of different heights can be run continuously on line 1. The entire machine may be microprocessor controlled and adjusted as to timing, sensor activation of the various movements, rates of travel, height, stroke(s) etc.

DECRIMPER/DECAPPER HEAD ASSEMBLY

Figure 4:
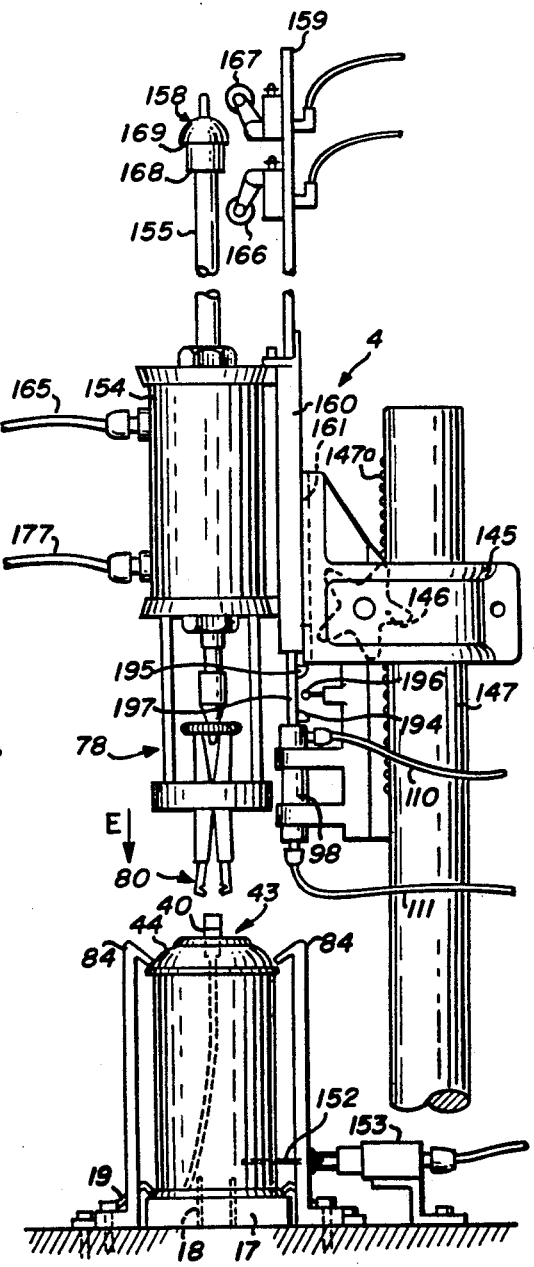
FIG. 4 is an enlarged side elevation view of the second, can decapping head station of the assembly line apparatus of FIGS. 1 and 2, showing the decrimper head and a previously de-pressurized aerosol can positioned thereunder.

FIG. 4 shows a side elevation of the decrimper/decapper head assembly 4 of this invention. Like the depressurizing head assembly 3 of FIG. 3, the height of the decrimper/decapper head assembly 4 may be adjusted along post 47 by a manual operation of hand wheel 46 or by can height sensors as described above on a can-by-can basis, or for different runs of cans of different heights. The operation of the decrimper head assembly will now be described with reference to FIG. 4 and the four sequential views, in partial cross-section, (FIGS. 4A-4D) of the decapper head 78.

The lowering sequence of the decapper head 78 onto the can assembly cap 43 of the can 11 is more complex than that of the vacuum head 51 since it relies on the additional cylinder 98 for pneumatic reciprocation of the decrimper head assembly 4 relative to the adjustment post 147 and head mounting casting 145. Upon engagement of the micro-switch arm 152 of pneumatic sensor 153 with the side wall of the moving can 11, pneumatic air line 110 is activated (pressurized). This fills cylinder 98 forcing the plunger 197 downward and causing the entire decrimper unit comprising: (a) the decapper head 78; (b) cylinder 154; (c) shaft 155; (d) post 159; and (e) bracket 160, to be lowered so that the pincers 80 are positioned over the cap 43 (as indicated by downward direction Arrow E of FIG. 4). Movement of bracket 160 with respect to the stationary head mounting casting 145 is facilitated by means of a sliding bearing or keyway 161 having bearing surfaces along substantially the entire length of the contact area between the two elements 145 and 160.

Figure 4A:
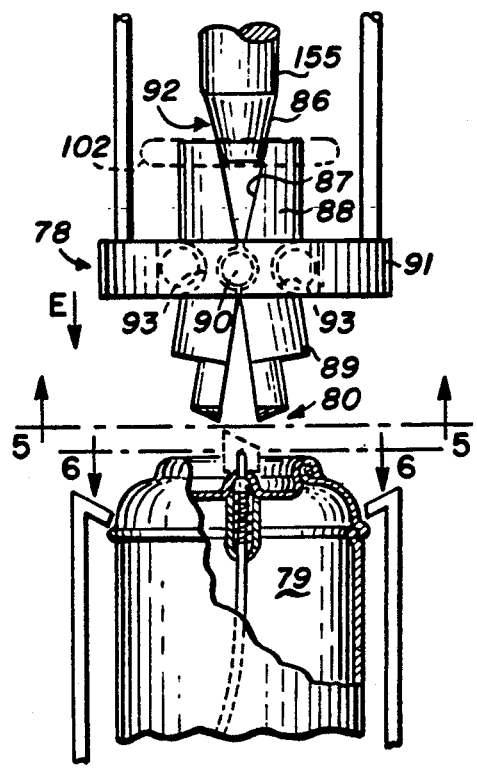
FIGS. 4A-4D are a sequence of four side elevation views, partially in section, of the decapper head of FIG. 4 showing the flanges of the aerosol cap being unrolled and released from the can body by application of radially inward force and subsequent upward pull on the cap crown by the decapper head pincers.
Figure 4B:
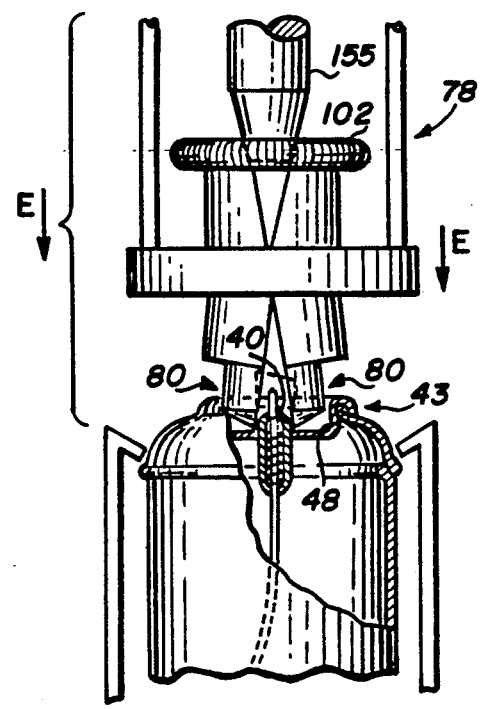

In the fully downwardly extended position, the pincers 80 come to just rest against or just above the top surface 48 of cap 43 and partially enclose or surround the crown (stem) 40 (see FIG. 4B). At this moment, upper contact 195 triggers switch 196 thereby sending a signal to begin injecting air into cylinder 154 via injection line 165. This, in turn, forces shaft 155 to reciprocate downwardly with respect to the decrimper head as seen by Arrow F in FIG. 4C.

Figure 4C:
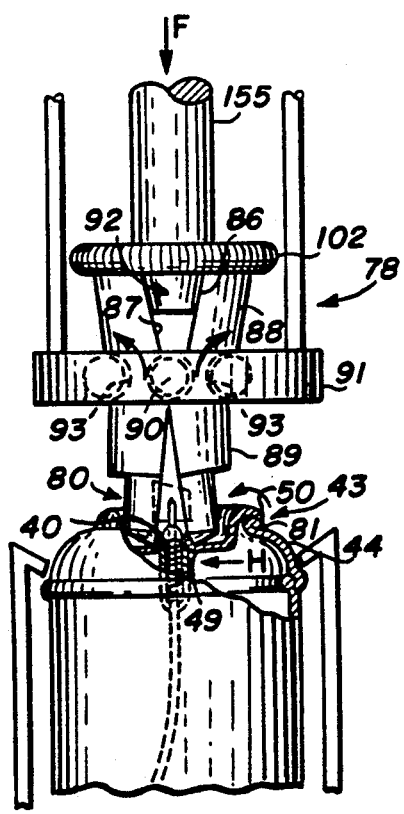

The detailed inner workings of the decapper head 78 is best described upon examination of FIGS. 4A and 4C. As shaft 155 is lowered into the decapper head 78, the tapered edges 86 of the conical tip 92 of shaft 155 come into wedging contact with the mating surfaces of the conical inner walls 87 of the upper portion 88 of pincers 80. The outward, splaying movement of the upper pincer portion 88 causes a reverse, closure-type movement in the lower pincer portion 89 of pincers 80. The mechanical sequence is facilitated by a ball pivot 90 disposed at the central intersection of the four pincher fingers 80. One continuous hemispherical pivot surface 93 is disposed along the exterior surfaces of each pincher finger 80 at approximately its midpoint, and functions to retain and permit the pincher fingers to remain within base member (ring) 91. The downward movement of the shaft 155 is translated into a lateral closure movement of the pincers 80 about the stem 40 through the mechanical workings of the upper pincer portion 88, lower pincer portion 89, center ball pivot 90, and torroidal pivot 93.

When firmly engaged and fully closed about the stem 40, the pincers 80, having a tremendous mechanical advantage, radially and inwardly deform the stem 40 and stress the top portion 49 in radially inward tension (arrow H in FIG. 4C). Stressing the cap 43 in this manner results in a partial unrolling of crimped flange 50, causing it to at least partly break the seal between flange 50 and the lip 81 of the can 11 (see FIG. 4C).

Upon full downward movement of shaft 155, as indicated by downward direction arrow F in FIG. 4C, pneumatic sensor 166 (see FIG. 4) is activated by engagement with lower contact 168 of mushroom head 158, thereby sending a signal to begin releasing pressure on the line 110 side of cylinder 98 and raising plunger 197 by pressurizing air line 111. This results in the entire unit (decapper head 78, cylinder 154, shaft 155 and post 159) being reciprocated upward with respect to the head mounting casting 145 and adjustment post 147 by bracket 160 sliding in keyed/keyway assembly 161. The now deformed cap 43, while still being firmly engaged by the pincers 80 since the downward pressure (arrow F in FIGS. 4C and 4D) is still applied, is subjected to an upward pull by this reciprocation.

Figure 4D:
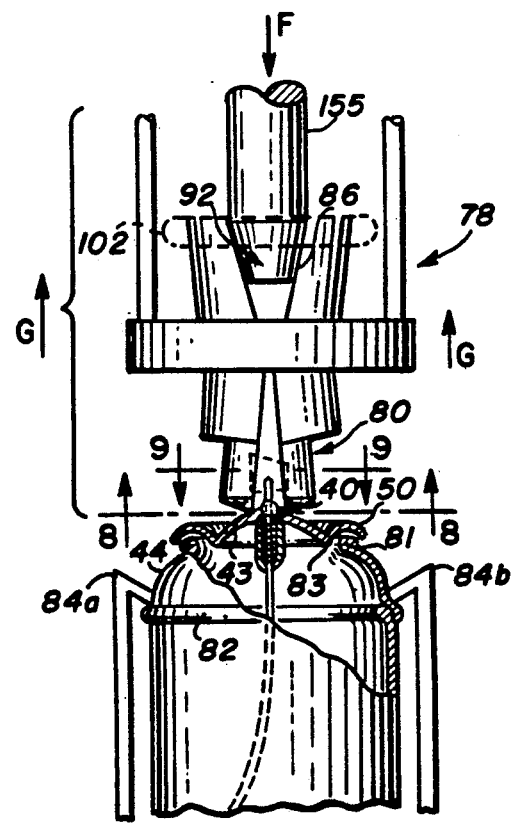

As best seen in FIG. 4D, prior to the upward deformation exerted on the cap 43, the rolled flange 50 may be still partially secured to lip 81 e.g. by the curl of crimped flange 50 over the bead lip 81. Then, the upward pulling force exerted on cap 43 and crown 40, by raising the entire decrimper head, produces a bowed-upward deformation of the central portion of cap 43 until the resistance of the seal between rolled flange 50 and lip 81 is completely broken, resulting in the cap 43 becoming completely separated from the can 11. This is called "decapping".

Optional additional opposed restraining members 84a, 84b by overlappingly engaging flange 82 of the can 11, further assist the guide rail members 19 (see FIG. 4) to firmly hold the can 11 down during the upward pulling phase of the decrimper assembly operation. The restraining members 84 are adjustable both vertically and laterally for cans of different sized diameters, or even spun aluminum cans (i.e., a can having no upper rolled flange). These restraining members, as well as the entire decrimper head assembly, may be adjustable vertically and horizontally from can to can by use of photo-optical sensors and microprocessors. In the case of a spun aluminum can, the restraining members 82 may be positioned further inward and appropriately shaped to matingly engage the curved area of the raised dome 44.

Upon plunger 197 extending upwardly out of cylinder 98, upper contact 194 engages sensor switch arm 196, thereby sending a signal to pressurize air line 177 while simultaneously depressurizing line 165 thereby causing shaft 155 to be raised upwardly through the cylinder 154. This, in turn, removes the tapered edge 86 of the shaft tip 92 from mating engagement with inner wall 87 of the upper pincer portion 88. A donut-type closure spring means 102 (shown only in FIGS. 4B and 4C) now forces the upper pincer portion 88 closed, there by opening the lower pincer portion 89 to the original open position. Pincers 80 now release the loosened cap 43 which drops and rests loosely on top of the can, typically on head 81.

The decrimper sequence is completed upon full upward extension of shaft 155. Pneumatic sensor 167 is triggered by engagement with mushroom head 158 sending a signal that restarts chain line 18, releasing can 11 so that it may proceed to the next station along the assembly line.

PINCERS

FIGS. 5-10 are an example of a "before and after" illustration showing the functioning of pincers 80 on cap 43. In FIG. 5, a bottom view (plan view or face-on view) of the pincers in the open position, the gap 101 left in the center of the pincers 80 is sufficient to receive the stem 40 of cap 43 (see FIG. 6). While FIG. 5 shows the use of a four pincer arrangement, it is understood that the invention is not limited by such an arrangement. For example, anywhere from a minimum of two, on up to a maximum of twenty pincers may be utilized in the decrimper head assembly. An increase in the number of pincers used results in a like increase in number of contact points between pincer 80 and crown (stem) 40, resulting in a more even deformation to the rolled flange 50 of cap 43. FIGS. 6 and 7 show top plan and side elevation views of a normal undeformed cap 43 and stem 40 crimped in position as it would be on a can (can not shown). Hole 29 is the hole left by hollow needle 70 during the depressurizing step. Multiple hollow, solid or grooved needles may be used. Indeed, any means for piercing the cap to permit the can pressure to release into an evacuated or contained space from which the can propellant may be employed without damaging the can body or top cap rim.

FIG. 8 shows the pincers 80 in the "closed" position. The four pincers 80 engage the stem 40 at four distinct points, as is generally indicated by radially inwardly directed arrows $H_1$-$H_4$ in FIG. 9. Surprisingly, note how the rolled flange 50 is uniquely deformed along portions of the flange 151 angularly between the four points of contact. In a four pincer arrangement, the greatest areas of deformation of the rolled flange 50 are at the four arc regions between the four pincer contact points, which deformation regions are spaced 90 degrees relative to each other and offset from the four pincer contact points by 45 degrees. Likewise, in a three pincer arrangement where the points of applied force contact the crown 40 are at 0, (360), 120, and 240 degrees, the greatest unrolling deformation of the rolled flange would occur at 60, 180, and 300 degrees. This unique flange deformation is directly related to the number of pincers employed in the decrimper head. This relationship can be expressed in a generalized formula:

$$\Delta = \tfrac{1}{2} I$$

where:
 $\Delta$ = deformation angle;
 I = the interval = 360°/T; and
 T = total number of pincers Thus, in the 3 pincer arrangement above, T=3, and the greatest deformation would occur at three evenly spaced arc regions offset from the 3 evenly spaced points of applied force by ½ the interval between the points of contact between the pincers 80 and the stem 40, i.e.: for T=3; the interval of the points of pincer contact, I=120; and the deformation angle $\Delta$=60°. In other words, the three pincers engage the cap at points 120°, 240° and 360° about the perimeter and the three points of greatest deformation occur at points 60°, 180° and 300° about the perimeter.

FIG. 10 shows how the inwardly directed radial forces of the pincers (denoted by the opposed horizontal arrows H), combined with the upward pulling force (denoted by the single vertical arrow G) cause the rolled flange 50 to unroll or slightly flatten out (as generally indicated by curved arrows J). A critical aspect of this invention is the unrolling effect on the crimped (rolled) flange 50 of the cap 43 as a result of the inwardly applied radial force of the pincers 80 to the insert (stem) 40. This result was not previously anticipated, as evidenced by the prior art methods which deformed both the cap and the can, thereby rendering both useless for immediate repackaging. The subsequent upward pulling stage of FIG. 4 is usually required to finally break any remaining bond and separate the cap 43 from the lip 81, but with appropriate number of pincers, and/or sufficient unrolling or unpeeling of cap flange 50 from can bead or lip 80 the upward pull may be minimal or unnecessary. Where that is not required the vertical reciprocation is not required and the operating cycle can be simplified (and speeded up) by eliminating or vertically restricting this motion.

FIG. 11 is a cross section view of the pincers 80 which shows the teeth 85 of the pincers 80. The teeth 85 function to engage and grip the nozzle neck (insert or stem) 40 at its base just above the surface 48 of the cap 43.

The additional upward pulling force causes the cap 43 to bow upwardly, further causing the inner shoulder 83 adjacent the rolled flange 50 (see FIG. 4D) to pull inwardly resulting in a further unrolling or flattening of the rolled flange 50 and breaking its sealing contact with the lip or bead 81. Deformation ribs 183 may (usually) form in the surface 48 of the can cap 43 during the upward pull. The upper end 140 of the can stem mushrooms out laterally slightly upon pinching to help prevent the can cap 43 from slipping out of the pincer teeth 85.

It is important to note that the lip 81 of the can 11 is not harmed or deformed in any way in this process; the can bodies may be cleaned and recycled and all wastes (propellant, solvent, chemicals, can top and dip tubes) recovered for disposal or recycle. Thus, the only hole in the can is needle hole 29 in the relatively inexpensive and replaceable top 40. The tops may be trashed or smelted to recover the metal values. Alternately, the needle hole can be plugged and the can caps reused.

FIG. 15 illustrates a depalletizer 203 feeding cans 11 to the can feeder 2 at the left end of line 1. The cans may also be brought in via other container systems such as drum 213. The rotary disk 12 feeds the cans via the timing screw 16 to the degassing vacuum head assembly 3 and then to the decapper head assembly 4 as shown by the arrow. The cans are inverted at 23 and emptied at station 6 as before. The waste chemicals 31 can be forwarded to a TSD facility via pipe 33. Where the cans are in good condition, and otherwise suitable for reuse, they are then forwarded to the wash station 7 where they are washed and dried. They are then uprighted at 205 and forwarded to a conventional repacking line 206. This comprises a standard filling head 207, inserting and crimping caps at recap station 208, and adding propellant through the nozzle at gassing station 209. The cans may then be forwarded to a standard palletizing station 210 where the cans, after being arranged in rows and stacked on cardboard separators 211, are wrapped with retaining plastic 212 as shown. Alternately, the cans may be taken off the line between stations 6 and 7 or after 7 and forwarded to a crusher 214 which crushes the cans 11 into a flattened "hockey puck" 215. The crushed cans may then be collected in bin 216 and forward to recycle. The depalletizer 203, crusher 205, packing line 206 and palletizer 210 are standard equipment in the industry.

PUCK

FIG. 12 shows use of a can holder puck 99 to hold cans having no flanged bottom during movement along the can recycle line, of this invention while being guidingly restrained by guide rails 19. This is accomplished by using a puck flange 100 adjacent the bottom of the sidewall of puck 99. Several pucks 99 of varying inside and/or outside diameters can be used for aerosol cans of varying outer diameters, or a single universal puck of a fixed outer diameter may have one or more axially aligned generally cylindrical bores 105 of varying diameter(s) for receivingly engaging cans of appropriately matching diameters. That is, a single universal puck having any single selected outside diameter 104 may be used. Since the puck exterior diameter 104 stays the same, no adjustment of guide rails 19 is required for mixed can size runs or from run to run. In the case of multiple bores, the bores are stepped, with the outer bore 105 being larger and terminating vertically in an inset shoulder 106, formed between it and the next smaller bore 107 which likewise may terminate at inset shoulder 108.

PNEUMATIC LOGIC FOR THE INVENTION

FIG. 13 shows the pneumatic logic diagram of this invention. The air flow sequence of the diagram will be described with cross reference to the elements previously discussed in the detailed description of FIGS. 1-4. The description will begin with a discussion of the pneumatic logic of a first loop where only the vacuum head assembly 3 is involved, followed by a discussion of how the air signals flow through the main cluster 115, the chain index drive 125, and the manifold table switch 120. Then the second loop involving both the depressurizing head assembly 3 and the decrimper/decapper head assembly 4 will be described.

PNEUMATIC LOGIC FOR THE FIRST LOOP INVOLVING ONLY THE DEPRESSURIZING HEAD

Looking at the center right of FIG. 13, as the first can advances along the assembly line it will trip the table-mounted pneumatic sensor 53 of the vacuum head assembly 3. This sends a signal to a ¼" double pilot "versa valve" 133 via intermediary shuttle valve 134a. The versa valve 133 injects air into the cylinder 54 via line 65 thereby forcing shaft 55 and mushroom head contact 58 downward. This begins the vacuum process of removing the can's gaseous contents. For the sake of clarity, all lines in FIG. 13 are pneumatic.

Referring also to FIGS. 3 and 3A-3D, vacuum line 27 connected to a vacuum source in order to remove the can's pressurized contents through the aperture made in the can top (e.g.) hollow needle 70 and the airway created within the vacuum head 51 during full downward extension of shaft 55. Full downward extension of shaft 55 also results in the activation of pneumatic sensor 66 (FIG. 13) which, in turn, sends a signal to begin raising the shaft 55 upward by depressurizing air line 65 and by injecting air into the cylinder 54 via the air circuit comprising air line 171, shuttle valve 134b, versa valve 133, and air line 77.

In order to assure that the vacuum process is complete before the shaft 55 is raised, a delay switch (not shown) may be incorporated into the line between pneumatic sensor 66 and versa valve 133. Otherwise, premature raising of the shaft 55 would result in the can's pressurized contents escaping into the atmosphere. The delay switch may be an independent electro-pneumatic control, a synchronized mechanical timer, a check valve/mechanical assembly or other like means for delaying the air signal to line 77 to begin filling the cylinder 54 and raise the shaft 55.

After the degassing step is complete the vacuum developed in isolation chamber 75 and the interior of the can 79 needs to be broken or else the can will be lifted when the isolation bell 56 with the seal 57 is raised. A check valve in the vacuum line 27 or at the vacuum pump (not shown) provides bleed air to equalize pressure so the seal 57 lifts off dome 44 easily. Alternately, a check valve can be provided in the side wall of the bell 56.

Where sufficiently low vacuum is not developed in can 79 via line 27, as determined by a vacuum sensor (not shown), that means the can is a "leaker" and should not be recycled (repacked). The can may be tagged at that stage, by labeling with a spot of flourescent color spray paint, and removed by hand or automatically ejected by ejector means (not shown) downstream of the dump station 6 after the cap has been removed.

After the degassing step is complete, the pressure equalized, and the shaft 55 has reached full upward extension, pneumatic sensor 67 is activated by mushroom head contact 58. This sends an air signal through air line 172 to a three way air pilot 116a of the main cluster 115. The main cluster 115 is the pneumatic "brain" of the entire assembly as it collects and ranks the order of the air signals from the various assemblies of the present invention before sending the signal to the chain index drive 125 to further advance the can down along the assembly line.

In the present best mode, the assemblies include the degassing head assembly 3 and the decrimper/decapper head assembly 4. They are connected to three-way pilots 116a and 116b of the main cluster 115 by their respective air lines 172 and 170. It is understood that any greater number of assemblies may be attached to and regulated by the main cluster 115 by merely adding additional three-way air pilots. Air pilot 116c is such an additional member which permits the connection of another assembly cluster 115 via line 176.

After all the signals have been received by the main cluster 115, a pneumatic signal is sent via air line 173 to switch 126a, which, in turn, relays the signal to the ¼" double pilot versa Valve 133. The versa valve 133 directs air into cylinder 132 via air line 178. The cylinder 132 is used to activate a ratcheted drive chain and crank assembly to advance the individual cans one space at a time as it receives signals from the main cluster 115. The stroke length of the cylinder 132 can be set for the desired index, whether it is single, double, triple index (i.e. 1, 2 or 3 cans at a time), etc., by graduating the limit 138 along the drive chain 139. The drive chain 139 is indexed forward by ratchet drive sprocket 128 and is biased by ratchet drive chain return 130.

The chain index drive process is complete when end-of-stroke switch 126b has been activated by limited 138, thereby sending a signal to inject air through air line 179 into the cylinder 132. through air line 175, shuttle valve 134 and versa valve 133. Impulse switch 131 is also activated, thereby sending a signal through air line 180 to the special N.O. safety switch 127. Safety switch 127 of the chain index drive 125 waits for the last signal sent by pneumatic sensors 67 and 167 during a can operating sequence before relaying the signal to the manifold switch 120. This is a safety precaution to prevent the manifold table switch 120 from prematurely sending a signal via lines 121 and 122 to all the pneumatic sensors of the various assemblies (pneumatic sensors 53 and 153 of FIG. 13) to release the cans before the depressurizing and decrimping stages have been completed. In the present discussion, only the degassing head assembly 3 is operating on a can, thus the last signal to the main cluster 115 comes from pneumatic sensor 67 via line 172.

PNEUMATIC LOGIC FOR THE SECOND LOOP INVOLVING THE VACUUM AND DECRIMPER/DECAPPER HEAD ASSEMBLY

The air logic for the decrimper/decapper head assembly 4 is similar to the vacuum head assembly 3, but includes an additional circuit involving the approach cylinder 98. As the first can comes into contact with the table mounted pneumatic sensor 153, a signal is sent through air line 110 to begin filling the approach cylinder 98 via shuttle valve 134 and ¼" double pilot versa valve 137. This causes plunger 197 to be lowered until upper contact 195 engages pneumatic sensor 196. The lowering of the plunger 197 into approach cylinder 98 corresponds to the lowering of the decapper head 78 on top of the can (see FIG. 4B). Contact of sensor 196 sends a signal through the air circuit comprising air line 198, shuttle valve 134, versa valve 133, and air line 165 to begin filling cylinder 154 and thereby cause shaft 155 to be forced downward. This corresponds to the pincers 80 engaging the crown 40 of FIG. 4C.

Upon full downward extension of the shaft 155, pneumatic sensor 166 is engaged by the mushroom head contact 158 to send a signal to begin raising the plunger 197 out of the approach cylinder 98 by depressurizing air line 110 and by pressurizing air line 111 with air injected through the air circuit comprising on-off three-way safety valves 135, air line 139, shuttle valve 134 and versa valve 137. This sequence corresponds to the raising of the decapper head 78 with the crown (stem) 40 still being engaged by the pincers 80 (see FIG. 4D).

Upon full upward extension of the plunger 197, pneumatic sensor 196 is activated by engagement with lower contact 194, thereby sending a signal via air line 199, on-off three way safety switch 135, shuttle valve 134, and versa Valve 133, to begin raising shaft 155 by depressurizing air line 165 and pressurizing air line 177. This corresponds to the release of the stem 40 by the pincers 80.

When the shaft 155 is fully upwardly extended, the mushroom head contact 158 engages pneumatic sensor 167, thereby sending a signal through air line 170 to the main cluster 115. This corresponds to the completion of one "decrimping/decapping" cycle. As described above, the main cluster 115 ranks the incoming signals from pneumatic sensor 167 of the decrimper/decapper head assembly 4 via line 170, and pneumatic sensor 67 of the vacuum head assembly 3 via line 172, before sending them along to the chain index drive 125 via line 173 to sequentially advance the next can(s) along the line.

In the preferred embodiment all versa valves are ¼", but it is understood that other commercially available sizes such as ½" may be used with equal success.

It should be understood that various modifications within the scope of this invention can be made by one of ordinary skill in the art without departing from the spirit thereof. For example, this system (apparatus and method) can be adapted to safely depressurize, decap and recycle aerosol cans of the type that have been bottom pressurized and have an intermediate piston such that the product and propellants are not mixed. S. C. Johnson & Son, Inc. of Racine, Wis. use these type of cans for dispensing its shaving gel product offered under the mark "EDGE".

FIG. 14 shows such an adaption of the system of this invention wherein a modified vacuum head assembly 186, having a hollow needle 188 is used to pierce, or push into the can, the rubber seal 18 to release and recover (e.g. by vacuum) the propellants. A boot and plunger assembly 185 is used to vertically restrain the can 187 during bottom depressurization and also to hold the valve actuator 190 open during depressurization so that a back vacuum in space 181 created by drop of piston 189 does not form. Any back pressure in space 181 is equalized by air through pathway 210, which connects the opened aperture within actuator 190 (the aperature is opened during actuation) to the ambient. This boot and plunger assembly 185 with pathway 210 leading to the ambient permits "bleeding in" air to equalize pressure in space 181. The bottom circular edge of the can 187 rests upon a sealing ring 191 so that the space 200 within the can bottom edge will be sealed from the atmosphere when the can is pressed downwardly by the boot and plunger assembly 185. Similarly, vacuum seals 192 and 193 are also used to keep the depressurization operation air tight. As an alternate to passage 210, a one-way check valve 182 may be employed in plunger assembly 185 to permit air to enter can space 181 via actuator 190.

The operation of vacuum head assembly 186 is the same as before except for the additional step of first lowering the boot and plunger assembly 185 on top of the can. The plunger 215 is reciprocated downward in the direction of Arrow I to depress the actuator 190, thus bleeding off any back pressure that may result during bottom depressurization. Alternately, bleeding off back pressure within space 181 may be accomplished by addition of a cap top puncturing needle (not shown) on the bottom of plunger 215. Propellant exhaust path is through bore 203 in shaft 55, holes 204, 205 and 206 which are aligned when shaft 55 is reciprocated upwardly for needle 188 to pierce plug 184. Where the needle 188 is hollow, passage 203 is axially aligned with it to provide a continuous degassing passageway.

Once the propellant has been removed from space 201, and the piston 189 drawn downwardly by the differential pressure to the bottom of the can, the can is sent to the decrimper assembly for removal of the cap 43 as before, and thence to the cap retrieval, wash/dry and can collection stations.

The conveyor chain may be selected to provide axial rotational twist so that the recycle line may be kept moving linearly in the same direction (rather than reversed) yet permit the cans at the cap recovery and wash/dry stations to be inverted, and thereafter returned to the upright position for refilling in a second line or a continuation of the recycle line, all on the same can advance chain. The chain may also be provided with lateral flexibility so the second refill line can be spaced laterally. Thus the cans would proceed through degassing, decapping, inversion as shown in FIG. 2 for cap collection, cleaning and drying, uprighting on a laterally spaced line parallel to the recycle (repacking) line through capping and filling stations, and onto a palletizer (packing) table, while the chain crosses back underneath to the start of the recycle line. Alternately multiple chains or other can moving means, guideways, and the like, may be employed. While it is preferred to keep the cans separated (spaced apart) the cans may be permitted to move along the line in contact. The cans may also be moved by rolling, pulled along by moving magnets (for ferrous cans), blown by air impulses, etc.

In the case of bottom pressurized, piston-type cans, where it is not desired to reuse (refill) the can with the piston, the piston-type can may be converted to a dip tube-type can, whereby the bottom plug is withdrawn and replaced with a rigid plug if needed. Optionally, a self-curing sealant may be employed to fill any needle hole left by needle 188. The piston 189 can be removed through the cap mouth defined by rim 81 (see FIG. 4D) in the cap dome. The piston 189 can be cut up with a centrifugal rotary cutter, the diameter of which expands upon rotation after lowering into the can through the cap aperture. The cutter shreds the plastic piston, and the shreds are flushed out and collected upon inversion, washing and drying.

It is also understood that other modifications, such as the integration of a robotic system to manipulate and position the cans as needed, is also within the scope of this invention without departing from the spirit thereof. For example, a multiple-needle depressurizer head may be employed, with one or more removing gas, and another simultaneously or sequentially providing bleed-in air. We therefore wish our invention to be defined by the scope of the appended claims as broadly as the prior art will permit, and in our view of the specification if need be.

We claim:

1. An aerosol can recycling apparatus for non-destructively removing top caps from propellant-pressurized aerosol cans of the type having a crimped top cap with a central actuator stem member in the center of a planar medial portion, which top cap is crimped-sealed to a rimmed opening at one end of said can body, comprising in operative combination:
    a) a first station including means for depressurizing an aerosol can through vacuum assisted removal of propellant gas contained within said aerosol can;
    b) a second station including means for decapping an aerosol can by breaking a seal between said crimped top cap and said rimmed opening of each can and non-destructively separating said top cap from said can;
    c) means for sequentially feeding aerosol cans through a plurality of stations on said aerosol can recycling apparatus including advancing cans from said first station to said second station; and
    d) means for collecting said propellant in communication with said first station.

2. An aerosol can recycling apparatus as in claim 1 which includes:
    a) means for crushing at least some of said can bodies disposed downstream of said first and second stations.

3. An aerosol can recycling apparatus as in claim 1 which includes:
    a) a third station disposed downstream of said second and first stations, said third station including means for separating the contents of said cans from said can bodies and said can tops; and
    b) means for separately collecting said contents and said can bodies; and
    c) said feeding means sequentially advances can bodies from said second station to said third station.

4. An aerosol can recycling apparatus as in claim 3 which includes:
    a) a fourth station disposed downstream of said third station including means for cleaning the interior of said can bodies; and wherein:
    b) said feeding means sequentially advances can bodies from said third station to said fourth station.

5. An aerosol can recycling apparatus as in claim 4 which includes:
    a) means for repacking said cans bodies disposed downstream of said second station; and wherein:
    b) said feeding means also advances said can bodies to said repacking means.

6. An aerosol can recycling apparatus as in claim 5 which includes:
    a) means for depalletizing pressurized cans in association with said sequential feeding means at a location along said sequential feeding means upstream of said first station; and
    b) means for palletizing said repacked cans associated with said repacking means at a downstream end thereof.

7. An aerosol can recycling apparatus as in claim 1 wherein:
    a) said depressurizing means and said decapping means include means for pneumatic operation; and which includes:
    b) means for actuating said depressurizing and decapping means.

8. An aerosol can recycling apparatus as in claim 7 which includes:
    a) means for sensing the presence of a can in said feeding means and actuating said depressurizing and decapping means in response to the sensed presence of a can at said first and second stations, respectively.

9. An aerosol can recycling apparatus as in claim 1 wherein:
    a) said depressurizing means of said first station further includes:
        i) means for isolating a propellant evacuation zone disposed in an end surface of an aerosol can associated with a depressurizing head assembly means;
        ii) means for positioning an aerosol can to be depressurized into alignment with said depressurizing means with said end surface of said can engageable by said propellant evacuation zone isolation means;
        iii) means for puncturing a hole in said aerosol can propellant evacuation zone to permit vacuum aided release and recovery of pressurized gas from said can when said isolation means is engaged with said can end; and
    b) said decapping means includes:
        i) means for decrimping which at least partially radially unrolls the cap crimp from said rim to at least partially break the seal between said cap assembly and said cap rim.

10. An aerosol can recycling apparatus as in claim 9 wherein:
    a) said depressurizing means includes means for reciprocatingly moving said can and said depressurizing means relative to each other so that said isolation means engages said can end, and wherein:
        i) said depressurizing means is reciprocable from a first, retracted position relative to said can to a second, extended propellant removal position;
        ii) said puncturing means is reciprocable from a first, retracted non-puncturing position to a second, extended puncturing position;
        iii) said puncturing means is disposed in telescoping association with said depressurizing means and is reciprocable between its first retracted nonpuncturing and second extended puncturing positions while said depressurizing means is in its second, propellant removal position; and iv) said puncturing means includes a hollow needle which communicates with means for vacuum assisted collection of propellant gas exiting said can upon puncturing disposed in association with said depressurizing means;

b) said cap member includes a generally planar medial portion between said outer rim and said central actuator stem member;

c) said decrimping means includes means for deforming at least a portion of said planar medial portion of said crimped top cap radially inwardly toward its central actuator stem member to at least partially unroll said crimped top cap from selected arcuate portions of said can rim opening to at least partially break said seal along said arcuate portions;

d) said top cap deforming means comprises means for pinchingly engaging said stem member adjacent its juncture with said planar medial portion with sufficient radial inward force to provide sufficient inward tension on at least one portion of said medial portion to cause arcuate deformation of said cap crimp effecting said partial unrolling from said rim and at least partial breakage of said seal between said cap crimp and said can opening rim; and which includes:

e) means for reciprocating said pincher means relative to said can body while pinchingly grasping said actuator assembly stem to complete the breaking of said seal between said cap crimp and said can opening rim.

11. An aerosol can recycling apparatus as in claim 10 wherein:

a) said vacuum assisted gas collection means includes means for forming a vacuum;

b) said depressurizing means includes a vacuum pathway from adjacent said can puncturing means to said gas collection means, said pathway being open to flow of said gas exiting said can when said needle is in its second, can puncturing position;

c) said isolation means includes a flexible sealing member adapted to form a seal with said can end; and which includes:

d) means for restraining movement of said can body during said pincher reciprocation; and wherein:

e) said reciprocation comprises relative movement of said pincher means away from said can end a distance sufficient to complete breaking of said seal; and wherein:

f) said reciprocating means moves said pincher means from a first position separated from said can stem member in axial alignment therewith to a second position adjacent a base portion of said can stem member where said can stem member is joined to said can top medial portion;

g) said pincher means includes means for moving said pinchers from a first, open position to a second, closed position to grasp said can stem member adjacent said stem base; and h) said decapping head assembly top removal means includes means for synchronizing the opening and closing of said pincher means so that said pincher means closes when said reciprocating means positions said pincher means adjacent said can stem base, and maintains said pincher means closed during a withdrawing motion from said second reciprocated position to said first reciprocated position.

* * * * *